T. GIBSON, G. A. FARMER & E. READ.
CIRCUIT CLOSING MECHANISM.
APPLICATION FILED MAY 29, 1913.
1,120,805.
Patented Dec. 15, 1914.
2 SHEETS—SHEET 2.
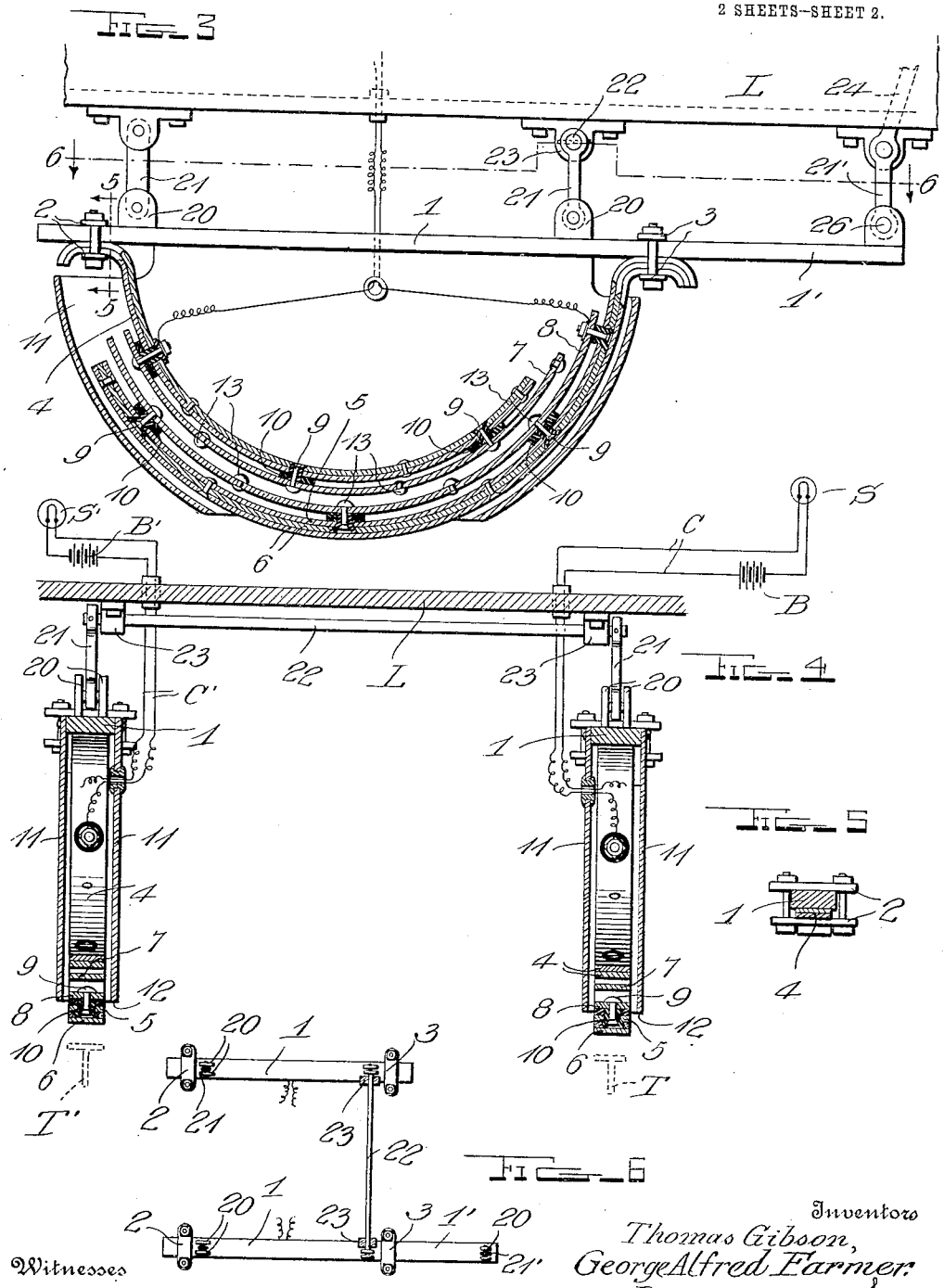
Witnesses
Inventors
Thomas Gibson,
George Alfred Farmer,
Edward Read
By 
Attorneys

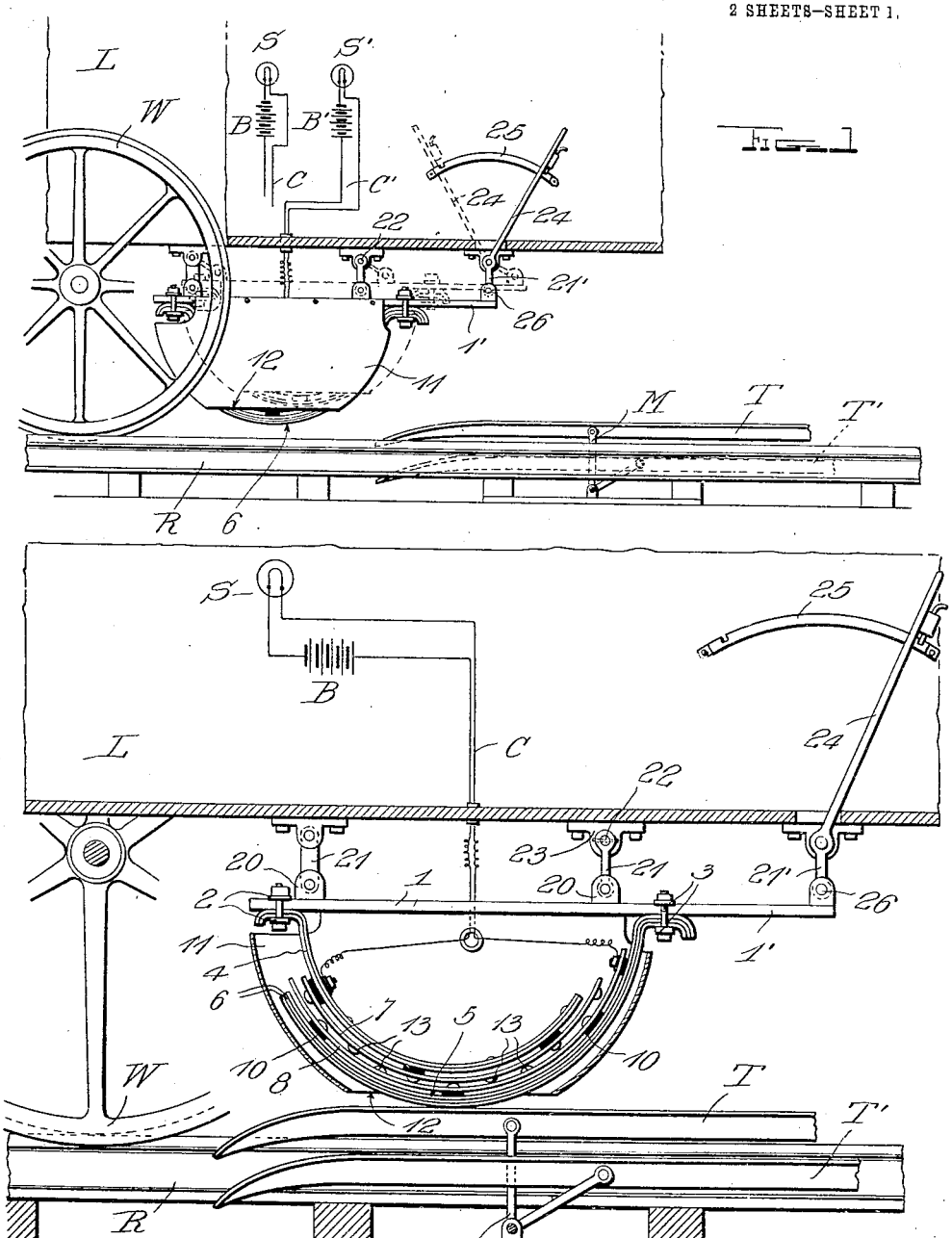

UNITED STATES PATENT OFFICE.

THOMAS GIBSON, GEORGE ALFRED FARMER, AND EDWARD READ, OF BURTON-UPON-TRENT, ENGLAND.

CIRCUIT-CLOSING MECHANISM.

1,120,805. Specification of Letters Patent. Patented Dec. 15, 1914.

Application filed May 29, 1913. Serial No. 770,723.

*To all whom it may concern:*

Be it known that we, THOMAS GIBSON, GEORGE ALFRED FARMER, and EDWARD READ, subjects of the King of Great Britain, residing at Clay Mills, Burton-upon-Trent, Staffordshire, England, have invented certain new and useful Improvements in Circuit-Closing Mechanisms; and we do declare the following to be a full, clear, and exact description of the invention, such as will enable others skilled in the art to which it appertains to make and use the same.

This invention relates to the general applications of electricity, and more particularly to circuit closers; and its object is to produce an electric circuit closer movably carried beneath a locomotive, motor car, or the like, and adapted to be manually thrown into or out of position where it will be acted upon by a closer bar which is raised for that purpose at a point where it is desired that the circuit shall be closed and an alarm or signal given the engineer or motorman.

To this end the invention consists in the details of construction hereinafter more fully described and claimed, and as shown in the drawings wherein—

Figure 1 is a general side elevation of this device mounted beneath the forward end of a vehicle moving on a track, and hereinafter broadly called the locomotive, the circuit closer being shown in full lines as depressed and about to engage a raised closer bar section, and in dotted lines as raised. Fig. 2 is an enlarged longitudinal section through the circuit closer, showing its parts as thrown into electrical contact with each other by reason of the fact that its lower portion or shoe rests on the raised section of the closer bar. Fig. 3 is a still further enlarged longitudinal section through the several elements constituting the circuit closer proper. Fig. 4 is a cross section through the two devices carried by a single locomotive. Figs. 5 and 6 are sectional details on the lines 5—5 and 6—6 respectively of Fig. 3.

In the drawings we have conventionally illustrated that portion of a locomotive L which we may assume is the cab thereof, the locomotive wheels W traveling on rails R as usual, and the motive power being immaterial. Within the cab are located two signals S and S', here shown as lights such as incandescent lamps which are rendered luminous by means of batteries B and B' in circuits C and C' respectively connected with the two circuit closers forming the subject matter of the present invention. Said circuit closers are duplicates of each other, and therefore we will describe but one. By preference they are located near opposite sides of and beneath the cab floor as seen in Fig. 4, and their shoes stand above sections T, T' of a closer bar which form no part of the railway track or its rails R but are by preference composed of short sections of rails sustained on mechanism M by means of which they may be alternately raised or lowered so that one is elevated above the level of the rails R at a time when the other is lowered beneath said level as seen in Fig. 2. The mechanism for raising and lowering these sections forms no part of the present invention, but is covered in a companion application filed by us on this day and bearing Serial Number 770724.

We may here say that the purpose of having two closer bar sections and two circuit closers is in order that when the locomotive is approaching a danger point, such as a street or road, a railway crossing, or a similar place or condition where it is desirable that a signal be given the engineer, one section such as T may be raised and the other section T' depressed to the left or west of the danger point, whereas the opposite disposition of the two sections is made to the right or east of said point—the result being that a proper signal is given to a locomotive passing along the line in either direction. Assume that the section T is beneath the circuit closer which connects with the signal S; if the crossing is clear the signal S may be a white light and the engineer is informed that he may proceed, whereas if the crossing is not clear or there is danger at this point the other section T' may be raised and the signal S' which might be red would inform the engineer that there is danger ahead. However, we do not wish to be confined to the specific details of this circuit closer, and as above stated the system which is to be employed forms the subject matter of a companion application and need not be further elaborated here.

Coming now more particularly to the details of the present invention, a bar 1 is disposed horizontally and longitudinally beneath the cab floor and has clips 2 and 3 near its extremities, and one of them supports the rear end of a curved steel spring 4 whereas the other supports the front end of a steel spring 5 which is struck on a slightly larger curve than and passes around outside the steel spring 4 as best seen in Fig. 2. The last mentioned and larger spring carries a curved shoe 6 which is by preference formed of a number of steel plates secured to the spring 5 in any suitable way and following the curvature thereof, and it is the lower face of this shoe which makes contact with the track section as shown.

The numerals 7 and 8 designate brass springs or strips disposed respectively over the lower face of the spring 4 and above the upper face of the spring 5, secured thereto by any suitable means such as bolts 9 but insulated therefrom as at 10; and the contiguous faces of these strips are not normally in contact with each other. The circuit wires C connect respectively with the two strips as indicated in Fig. 2, and lead thence upward to the signal S as shown.

By preference we inclose the whole device within a casing 11 having side plates which are nearly semi-circular and an edge plate which is cut away at the bottom as at 12 to a line well above the upper surface of the track section T so that the casing will not scrape upon it but the lowermost point of the shoe 6 projects through the casing and comes into contact therewith. With this construction it follows that, when the parts stand as shown in full lines throughout the drawings and the closer bar section T is raised, as the locomotive approaches such section the latter will elevate the shoe slightly, the shoe will raise the lower spring 5 and said spring will raise the lower strip 8 into contact with the upper strip 7; and in order to be absolutely certain that a good contact is made between the two pairs of strips we preferably stud their contiguous faces at several points as shown at 13. The circuit C is thereby closed, and the battery B illuminates the signal S in a manner which need not be amplified.

In order that the circuit closer may be thrown entirely out of action whether either closer bar section is raised or not, we preferably mount it movably beneath the cab floor in a manner now to be described. That is to say, to ears 20 rising from the bar 1 are pivotally connected links 21 one of which has its upper end mounted fast on a cross rod 22 hung in bearings 23 beneath said floor; and a hand lever 24 moving over a segment 25 has its lower end 21' pivoted as at 26 to an extension 1' of one bar in order that the latter can be swung on its pivotal supports. When two of these circuit closers are employed beneath the cab floor as shown in the drawings, we preferably carry one of the bars forward into an extension 1' as best seen in Fig. 6, and connect the lower end of the lever 24 with said extension as shown in Fig. 2—the obvious reason being because when the device is to be thrown entirely out of action one lever is sufficient for raising both the circuit closers. However, it is quite obvious that separate levers could be employed if desired. In the carrying out of our general idea, this is the means we prefer whereby the engineer can cut himself off completely from the system and from the possibility of being signaled by its operation, but we apprehend that in some communities or under some circumstances it may be considered unwise to give the engineer that privilege and in that case we would simply omit this mechanism. Then if the actuating mechanism of the closer bar sections T and T' were such that one of such sections must always be raised, it would likewise be impossible for an operator on the ground to in any way cut the engineer out of the system or set the devices so that no signal whatever would be given him as he approached a danger point.

Attention is directed to the fact that the shoe 6 is merely a wear plate which is intended to slide along the face of the section T, it is not necessarily in circuit, and it is not essential that this shoe shall make electrical contact with said section because the circuit is complete upon the locomotive and is closed by upward pressure on said shoe whether imparted by a section of this character or by any other member serving as a closer or lifter to raise the shoe a sufficient distance to throw the two strips 7 and 8 into electrical contact with each other, whether it maintains the shoe in that position for only an instant or for a longer period of time. We do not of course wish to be limited to the precise details or the materials or proportions of parts.

What is claimed as new is:

1. The herein described circuit closer comprising a pair of downwardly curved metallic members respectively connected with the wires of the circuit to be closed and standing out of normal contact with each other, a support to which one end of one member and the other end of the other member is connected, and a casing comprising upright sides attached to said support and having curved lower edges cut away on a chord across their lowest portions.

2. The herein described circuit closer comprising a pair of normally spaced apart metallic members respectively connected with the wires of the circuit to be closed and curved concentrically, a support to which one end of one member and the other end of the other member is connected, links pivotally sustaining said support from an overhead element, and means for swinging the support on its links, for the purpose set forth.

3. The herein described circuit closer comprising a pair of normally spaced apart metallic members respectively connected with the wires of the circuit to be closed and curved concentrically, a support to which one end of one member and the other end of the other member is connected, ears rising from said support, a pair of links pivoted at their lower ends in said ears and at their upper ends in an overhead element, an extension at one end of said support, and a hand lever pivotally connected with said extension, for the purpose set forth.

4. The herein described circuit closer comprising a downwardly curved steel spring having one end horizontal, a second steel spring struck on a slightly larger curve than the first spring and having its other end horizontal, metallic strips carried by but insulated from the contiguous faces of said springs and out of normal contact with each other, said strips being respectively connected with the wires of the circuit to be closed, a shoe carried by the outer face of the lowermost spring for the purpose set forth, and a support for said ends.

5. The herein described circuit closer comprising a curved steel spring having one end outturned, a second steel spring struck on a slightly larger curve than the first spring and having its other end outturned, metallic strips carried by but insulated from the contiguous faces of said springs and out of normal contact with each other, said strips being respectively connected with the wires of the circuit to be closed, a casing inclosing all said parts, a horizontal bar supporting the casing and extending over said outturned ends, clips connecting the latter with said bar, and means for sustaining the bar from an overhead element.

6. The combination with a closer bar mounted between the rails of a railway line; of a circuit closer comprising downwardly curved metal members out of contact with each other and disposed above the line of said bar, the members being respectively connected with the wires of the circuit to be closed, and means for supporting said circuit closer beneath a locomotive and depressing it into contact with said closer bar.

7. The combination with a closer bar mounted between the rails of a railway line; of a circuit closer comprising downwardly curved metal members out of contact with each other and disposed above the line of said bar, the members being respectively connected with the wires of the circuit to be closed, a bar supporting said members, and movable connections between said supporting bar and a locomotive whereby the circuit closer may be lowered so as to make contact with said closer bar or may be raised entirely out of contact therewith.

8. The combination with a pair of closer sections disposed between the rails of a railway line; of a pair of circuit closers, signals, to which their terminals are respectively connected, parallel bars respectively supporting said circuit closers and one of them extended at one end, swinging supports for said bars adapted to be attached to the floor of a locomotive cab, and mechanism also adapted to be mounted in said cab for swinging said bars on their supports.

In testimony whereof we have hereunto set our hands in presence of two subscribing witnesses.

THOMAS GIBSON.
GEORGE ALFRED FARMER.
EDWARD READ.

Witnesses:
CHAS. W. CLEMENT,
JOSEPH COATES.

Copies of this patent may be obtained for five cents each, by addressing the "Commissioner of Patents, Washington, D. C."